United States Patent [19]

Singletary

[11] Patent Number: 4,896,894
[45] Date of Patent: Jan. 30, 1990

[54] STROLLER CARSEAT APPARATUS

[76] Inventor: David L. Singletary, 3759 Glenayre La., Oshkosh, Wis. 54904

[21] Appl. No.: 295,132

[22] Filed: Jan. 9, 1989

[51] Int. Cl.$^4$ ............................................... B62B 7/12
[52] U.S. Cl. ..................................... 280/30; 280/648; 280/649; 340/686
[58] Field of Search .................... 340/686; 280/30, 37, 280/647, 648, 649, 650, 47.371, 643

[56] References Cited

U.S. PATENT DOCUMENTS

| | | | |
|---|---|---|---|
| 2,435,733 | 2/1948 | Belyeu | 280/30 |
| 2,449,618 | 9/1948 | Pritchard | 280/648 |
| 2,607,396 | 8/1952 | Stambaugh | 280/648 |
| 2,734,104 | 2/1956 | Gollhofer | 340/686 X |
| 3,944,241 | 3/1976 | Epelbaum | 280/30 |
| 4,632,409 | 12/1986 | Hall et al. | 280/643 |
| 4,641,844 | 2/1987 | Mar et al. | 280/30 |
| 4,736,959 | 4/1988 | Steenburg | 280/30 |

Primary Examiner—Charles A. Marmor
Assistant Examiner—Michael Mar
Attorney, Agent, or Firm—Leon Gilden

[57] ABSTRACT

A stroller carseat apparatus is set forth wherein a carseat includes a scissor-like underlying framework including a pivotally mounted wheel proximate each corner of the framework securable in a first locked upper position to a second lowered extended position. An electrical circuit is included within the framework wherein an illumination source proximate the uppermost portion of the seat is illuminated upon completion of a circuit effected by the locking of the wheels in the second lowered position.

8 Claims, 1 Drawing Sheet

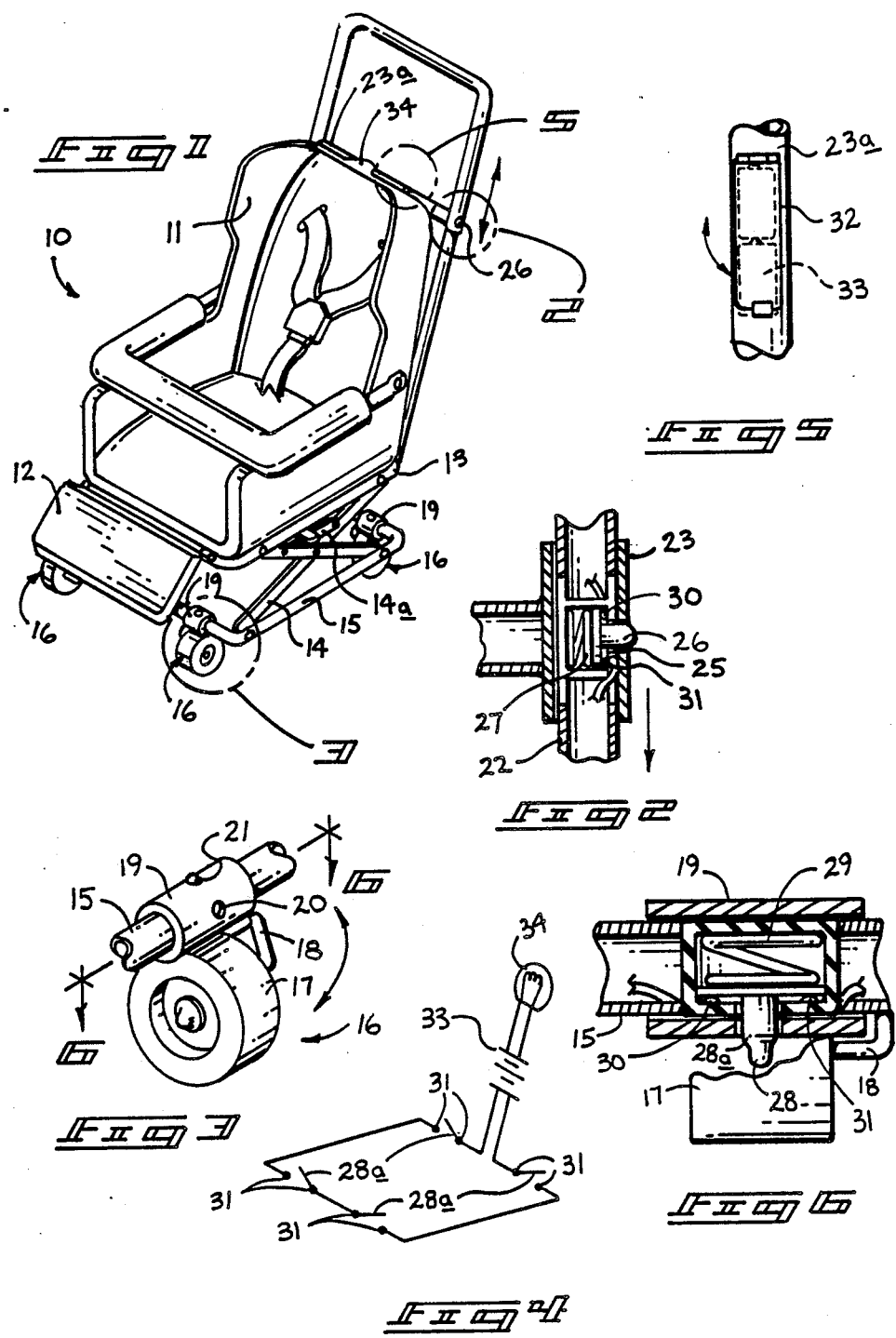

STROLLER CARSEAT APPARATUS

BACKGROUND OF THE INVENTION

1. Field of the Invention

The field of invention relates to convertible carseat apparatus, and more partiuclarly pertains to a new and improved convertible carseat apparatus wherein the same includes an illumination device for indication of extension of the wheels of the apparatus in a downward extended position.

2. Description of the Prior Art

The use of convertible carseat apparatus for securement of infants is well known in the prior art. The prior art has heretofore failed to include indicator devices for providing visual indication of a safe positioning of the wheels associated with such apparatus avoiding accidents and the like. For example, U.S. Pat. No. 2,435,733 to Belyeu sets forth a motor vehicle seat for use by an infant provided with a retractable handle for securement of the seat of an automobile, or alternatively as a lowermost framework of the seat when used as a stroller.

U.S. Pat. No. 2,449,618 to Pritchard sets forth a framework for use as a stroller for an automotive environment wherein a handle is pivotally mounted overlying a plurality of hooks that secure a carseat when overlying a carseat in use. The Pritchard device fails to set forth an indicating means for providing indication of a safe use of the device as a stroller, as taught by the instant invention.

U.S. Pat. No. 2,607,396 to Stambaugh sets forth a carseat and convertible baby cart for use in securement to an automobile seat and alternatively to be utilized as a portable carseat wherein a rearwardly mounted telescoping wheel relative to the framework enables the device to be positioned adjacent an automobile carseat or for use as a stabilizing wheel as a stroller.

U.S. Pat. No. 4,632,409 to Hall, et al., sets forth another example of an automotive-type infant seat convertible to a baby stroller wherein the infant seat is compactly retracted into a nested position with the wheels pivoted in a parallel relationship to the framework, but as is typical of prior devices, fails to provide a visual indicator means set forth by the instant invention to indicate appropriate locking of the wheels in an extended position.

U.S. Pat. No. 4,641,844 to Mar, et al., sets forth a retractable baby seat apparatus convertible to a stroller and into an infant carrier to be borne by an individual. The unit is intended to present a light-weight compact, storable arrangement.

As such, it may be appreciated that there is a continuing need for a new and improved infant seat stroller apparatus wherein the same may be compactly stored during periods of non-use and may be further readily extended to be utilized as a stroller or positioned in a retracted position for securement against an automobile seat.

SUMMARY OF THE INVENTION

In view of the foregoing disadvantages inherent in the known types of infant seat stroller apparatus now present in the prior art, the present invention provides an infant seat stroller apparatus wherein the same provides for a framework that may be telescopingly retracted into a first position to enable the apparatus to be positioned adjacent an automobile seat and extended into a second position including visual illumination means to indicate appropriate extension of the wheels of the apparatus. As such, the general purpose of the present invention, which will be described subsequently in greater detail, is to provide a new and improved infant seat stroller apparatus which has all the advantages of the prior art infant seat stroller apparatus and none of the disadvantages.

To attain this, the present invention comprises an infant seat stroller apparatus including a telescopingly retractable handle and underlying scissor carriage arrangement to extend a plurality of wheels position proximate each corner of the framework wherein the wheels are pivotal from a first retracted position to a second extended position and includes circuitry with illumination means to indicate appropriate extension of the wheels to the second lowered position.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved infant seat stroller apparatus which has all the advantages of the prior art infant seat stroller apparatus and none of the disadvantages.

It is another object of the present invention to provide a new and improved infant seat stroller apparatus which may be easily and efficiently manufactured and marketed.

It is a further object of the present invention to provide a new and improved infant seat stroller apparatus which is of a durable and reliable construction.

An even further object of the present invention is to provide a new and improved infant seat stroller apparatus which is susceptible of a low cost of manufacture with regard to both materials and labor, and which accordingly is then susceptible of low prices of sale to the consuming public, thereby making such infant seat stroller apparatus economically available to the buying public.

Still yet another object of the present invention is to provide a new and improved infant seat stroller apparatus which provides in the apparatuses and methods of the prior art some of the advantages thereof, while simultaneously overcoming some of the disadvantages normally associated therewith.

Still another object of the present invention is to provide a new and improved infant seat stroller apparatus wherein the same provides for illumination means for visual indication of desired extension of the wheels of the apparatus for use as a stroller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic cross-sectional view of the handle latch arrangement, as indicated in FIG. 1.

FIG. 3 is an isometric illustration, somewhat expanded, of the locking arrangement of the wheel as indicated in FIG. 1.

FIG. 4 is a diagrammatic representation of circuitry utilized by the instant invention.

FIG. 5 is an orthographic top view of the battery storage compartment positioned within the handle framework of FIG. 1.

FIG. 6 is an orthographic cross-sectional view taken along the lines 6—6 of FIG. 3 in the direction indicated by the arrows.

DESCRIPTION OF THE PREFERRED EMBODIMENT

With reference now to the drawings, and in particular to FIGS. 1 to 6 thereof, a new and improved infant seat stroller apparatus embodying the principles and concepts of the present invention and generally designated by the reference numeral 10 will be described.

More specifically, it will be noted that the infant seat stroller apparatus 10 essentially comprises a conventional infant seat 11 formed with a pivoted foot rest 12 each mounted to a first rectangular framework 13. The first bottom framework 13 is reciprocatably mounted to a second rectangular bottom framework 15 spaced underlying the first bottom framework by a scissor frame 14 formed with a latch 14a for reciprocatably mounting the second bottom framework 15 relative to the first bottom framework 13. Four wheels 16 are mounted adjacent each corner of the second bottom framework 15 and are formed with a wheel 17 including a "U" shaped axle 18 including a first leg positioned through the center of each wheel 17 and a second overlying leg integrally secured to a rotatable tubular mount 19 rotatably mounted about the second bottom framework 15.

The tubular mount is formed with a first aperture of a first diameter and a second aperture 21 spaced from the first aperture 20 of a second diameter wherein the diameter of second aperture 21 is greater than that of the diameter of aperture 20.

A rear framework 22 is mounted to the rear of the seat 11 and is telescopingly secured within a "U" shaped handle 23. The rear framework 22 is formed with a plurality of spaced frame apertures 24 oriented to be selectively aligned with a handle aperture 25 with a resiliently biased latch button 26 mounted to the latch plate 26a to secure and maintain the frame aperture 24 in alignment with the handle aperture 25. Upon depressing of the latch button 26, the "U" shaped handle 23 may be forced downwardly to telescopingly receive the rear framework 22, as indicated by the arrow in FIGS. 1 and 2. A first spring 27 normally biases the latch plate 26a and the latch button 26 outwardly.

A modified latch button arrangement is utilized to secure the tubular mount 19 in a respective first position to maintain the respective wheels in a retracted orientation, or generally aligned with the framework 15 or extended to a second lowered position, as illustrated in FIG. 1 wherein the wheels are positioned below the second bottom framework 15. A second spring 29 is positioned beneath a latch button plate 28a to project a wheel latch button 28 outwardly through respective first and second apertures 20 and 21. The wheel latch button 28 is of a stepped configuration with the uppermost portion of the latch button formed of a diameter approximately equal to the diameter of the first aperture 20 with the lowermost diameter of the wheel latch button 28 formed of a second diameter adjacent the latch button plate substantially equal to the diameter of the second aperture 21. In this manner, the latch button 28 may project upwardly only a portion of its length as the uppermost portion of latch button 28 is received within the first aperture 20 wherein the latch button plate 28a is spaced from a pair of contacts 31 within a circuit, but upon rotation of each respective wheel 16 downwardly, the latch button 28 may project outwardly its entire length as the lowermost portion of the latch button 28 and its enlarged diameter is received within the enlarged and complementary diameter of the second aperture 21. In this manner (with reference to FIG. 4) as each wheel unit 16 is rotated to its respective second lowered and extended position, each wheel latch button plate 28a acts as a switch to complete a circuit to illuminate an associated illumination member 34. The illumination member 34 is positioned within a cross member of the "U" shaped handle 23 with a battery cover 32 overlying a battery compartment to receive a plurality of batteries 33. It should be noted that the contacts 31 are positioned upon insulative material to enable only the wheel latch button plate 28a to provide a complete circuit across the respective contacts 31.

Accordingly upon each of the wheel units 16 being rotated downwardly to a second extended position, the illumination member 34, which may comprise a light emitting diode or conventional light bulb, will be illuminated for indication of a ready mode of the apparatus to accept an infant.

The manner of usage and operation of the instant invention therefore should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An infant seat stroller apparatus comprising,
   an infant seat fixedly secured to a first bottom framework,
   a second bottom framework reciprocatably mounted relative to said first bottom framework and underlying said first bottom framework with a scissor frame mounted within said first and second bottom framework to effect positioning of said second bottom framework relative to said first bottom framework,
   a rear framework including a handle mounted rearwardly of said infant seat,
   a plurality of spaced wheel units rotatably mounted to said second bottom framework and rotatable from a retracted first position to a lowered ground engaging second position relative to said second bottom framework,
   each wheel unit including a rotatable member selectively securable in said first or second positions with a plurality of apertures engageable with a wheel latch button mounted within said second bottom framework and a switch adapted to be in a closed position when the wheel unit is rotated to the lowered second position, and,
   visual indicator means mounted in said handle operatively associated with the switch of each wheel unit for providing a visual indication only when all of said wheel units are positioned in said lowered second position.

2. An infant seat stroller apparatus as set forth in claim 1 wherein said plurality of apertures comprise a first aperture operatively associated with said latch button to position said wheel unit in said first position and a second aperture offset relative to said first aperture and operably associated with said latch button to position said wheel unit in said second lowered position, said second aperture having a diameter greater than said first aperture.

3. An infant seat stroller apparatus as set forth in claim 2 wherein said latch button comprises a latch button resiliently mounted within said second bottom framework and formed with a latch plate mounted within said second bottom framework and including an orthogonally extending button wherein said button comprises a stepped profile with an outwardly positioned first diameter substantially equal to the diameter of said first aperture and a second diameter adjacent said latch plate of a diameter substantially equal to the diameter of said second aperture.

4. An infant seat stroller apparatus as set forth in claim 3 wherein said switch of each wheel unit includes a plurality of electrical contacts positioned within said second bottom framework and mounted for engagement with said latch plate when said second aperture is aligned with said button.

5. An infant seat stroller apparatus as set forth in claim 4 wherein said indicator means mounted within said handle comprises an illumination means electrically associated with the switch of each wheel unit whereupon when all of said wheel units are positioned in said second position, an electrical circuit is completed for illumination of said illumination means.

6. An infant seat stroller apparatus as set forth in claim 5 wherein said handle further includes a battery compartment including at least one battery for supplying electrical energy to said illumination means.

7. An infant seat stroller apparatus as set forth in claim 6 wherein said handle telescopingly receives said rear framework.

8. An infant seat stroller apparatus as set forth in claim 7 wherein the handle includes a handle aperture aligned with a frame aperture, and a further latch button and latch plate mounted within said rear framework whereupon depressing of said latch button enables said handle to telescopingly receive said rear framework.

* * * * *